(12) United States Patent
Verbrugge et al.

(10) Patent No.: US 6,750,579 B2
(45) Date of Patent: *Jun. 15, 2004

(54) PERMANENT MAGNET MOTOR FLUX RINGS

(75) Inventors: Brandon Verbrugge, Towson, MD (US); Robert J. Marcinkowski, Cockeysville, MD (US); Earl M. Ortt, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 67 days.

This patent is subject to a terminal disclaimer.

(21) Appl. No.: 10/189,688

(22) Filed: Jul. 3, 2002

(65) Prior Publication Data

US 2002/0171307 A1 Nov. 21, 2002

Related U.S. Application Data

(63) Continuation of application No. 09/520,471, filed on Mar. 8, 2000, now Pat. No. 6,522,041.

(51) Int. Cl.⁷ .................................................. H02K 1/17
(52) U.S. Cl. .............................. 310/154.08; 310/154.03
(58) Field of Search ....................... 310/154.03, 154.06, 310/154.09, 154.11, 154.12, 154.13, 154.07, 154.08; 29/596–598

(56) References Cited

U.S. PATENT DOCUMENTS

| | | |
|---|---|---|
| 3,422,295 A | 1/1969 | Parker |
| 4,227,105 A | 10/1980 | Kumakura |
| 4,260,916 A * | 4/1981 | Theissig ................ 310/50 |
| 4,309,815 A * | 1/1982 | Schmitt et al. ............. 310/154 |
| 4,327,346 A | 4/1982 | Tada et al. |
| 4,335,323 A | 6/1982 | Kebbon et al. |
| 4,464,595 A | 8/1984 | Hamano et al. |
| 4,547,758 A | 10/1985 | Shimizu et al. |
| 4,594,525 A | 6/1986 | Stokes |
| 4,625,392 A | 12/1986 | Stokes |
| 4,668,887 A | 5/1987 | D'Argouges et al. |
| 4,683,393 A | 7/1987 | Stokes |
| 4,757,224 A * | 7/1988 | McGee et al. .............. 310/168 |
| 4,757,603 A | 7/1988 | Stokes |
| 4,793,054 A * | 12/1988 | Abbratozzato et al. ....... 29/596 |
| 4,795,932 A | 1/1989 | Long |
| 4,801,834 A | 1/1989 | Stokes |
| 4,850,100 A | 7/1989 | Stokes |
| 4,873,461 A * | 10/1989 | Brennan et al. .............. 310/47 |
| 4,881,988 A | 11/1989 | Bonser |
| 4,910,861 A | 3/1990 | Dohogne |
| 4,973,872 A | 11/1990 | Dohogne |
| 5,121,021 A | 6/1992 | Ward |
| 5,160,867 A | 11/1992 | Niemela |

(List continued on next page.)

FOREIGN PATENT DOCUMENTS

| | | |
|---|---|---|
| DE | 321007 | 1/1919 |
| DE | 1613011 | 10/1970 |
| DE | 2155752 | 5/1973 |

(List continued on next page.)

Primary Examiner—Tran Nguyen
(74) Attorney, Agent, or Firm—Harness, Dickey & Pierce, P.L.C.

(57) ABSTRACT

A power tool includes a motor with a flux ring. The flux ring includes a ring member with a first and second end. The ends are positioned with respect to one another such that the ends move towards and away from one another during compressing and expanding of the ring. At least one anchor is unitarily formed with the ring. A pair of magnets are coupled with unitarily formed anchors to couple the pair of magnets with the ring. The magnets are coupled with the ring such that the ring may be compressed and expanded with the magnets secured in the ring.

15 Claims, 6 Drawing Sheets

Figure-2

U.S. PATENT DOCUMENTS

| | | | |
|---|---|---|---|
| 5,201,111 A | | 4/1993 | Prohaska |
| 5,203,071 A | | 4/1993 | Neimela |
| 5,206,556 A | | 4/1993 | Hayakawa |
| 5,216,306 A | * | 6/1993 | Nakazawa et al. ............ 310/89 |
| 5,268,607 A | | 12/1993 | McManus |
| 5,528,095 A | | 6/1996 | Stobl |
| 5,584,114 A | | 12/1996 | McManus |
| 5,679,994 A | * | 10/1997 | Shiga et al. ................ 310/154 |
| 5,861,695 A | * | 1/1999 | Brassard ..................... 310/154 |
| 5,881,446 A | | 3/1999 | Shiga et al. |
| 5,895,026 A | | 4/1999 | Linkner, Jr. et al. |

FOREIGN PATENT DOCUMENTS

| | | | | |
|---|---|---|---|---|
| DE | 2535210 | | 2/1977 | |
| DE | 3036941 | | 4/1982 | |
| DE | 2622585 | | 4/1983 | |
| DE | 4401847 | | 7/1995 | |
| DE | 19524953 | | 1/1997 | |
| EP | 0168743 | | 7/1985 | |
| EP | 0186530 | | 10/1985 | |
| EP | 0496075 | | 11/1995 | |
| FR | 2617344 | | 6/1987 | |
| FR | 2617345 | * | 6/1987 | ................ 310/154 |
| FR | 2 617 345 | | 12/1988 | |
| JP | 36-8012 | | 4/1936 | |
| JP | 60-131055 | | 7/1985 | |
| JP | 2-86418 | | 3/1990 | |

\* cited by examiner

PERMANENT MAGNET MOTOR FLUX RINGS

BACKGROUND AND SUMMARY OF THE INVENTION

The present invention relates to power tools and, more particularly, to motors for the power tools which include flux rings.

In electric motor construction, the motor magnets must be retained on the housing or on a separate flux ring positioned within the housing. Ordinarily, these magnets have been glued or adhered to the metallic flux ring or housing. When using a flux ring, different methods have been utilized to position the flux ring and magnets in the housing. One such way is to position the flux ring within the housing and then add the magnets onto the flux ring. Another method is to generally adhere the magnets onto a flux ring and then slide the flux ring into the housing. Thus, it would be desirable to provide a flux ring with the magnets positioned on the flux ring which could be positioned into a motor housing and frictionally engage the motor housing to hold the flux ring in place during assembly.

The present invention provides the art with a flux ring which is capable of radial expansion and contraction with the magnets secured to the flux ring. In order to manufacture a motor with a flux ring, it is desirable to position the flux ring into the housing wherein the flux ring frictionally engages the interior periphery of the housing until the flux ring is secured to the housing. Also, the flux ring minimizes the gap between its ends to provide maximum magnetic flux carrying capacity.

In accordance with a first aspect of the invention, a flux ring comprises a ring member having a first and a second end. The ends are positioned with respect to one another such that the ends move towards and away from one another during compressing and expanding of the ring during assembly. At least one anchor is unitarily formed with the ring. At least one magnet is coupled with the unitarily formed anchor to couple the at least one magnet with the ring. The magnet is coupled with the ring such that the flux ring may be compressed and expanded with the at least one magnet coupled with the ring during assembly. One of the first or second ends overlaps or meshes with the other end. The at least one magnet is formed on the ring such that the magnet embeds with the anchor to couple the magnet to the ring. The first and second ends may include at least one mating or meshing projection and receiving recess. The at least one magnet is injection molded onto the ring. The anchor may be an aperture in the ring with a counter-sink. Also, the anchor may be a member unitarily formed with the ring and radially projecting from the ring. A combination of the anchors may be used.

In accordance with a second aspect of the invention, an electric motor comprises a motor can housing with a pair of end caps coupled to the motor can. A flux ring is positioned within the motor can housing. The flux ring includes a ring member having a first and a second end. The ends are positioned with respect to one another such that the ends move towards and away from one another during compressing and expanding of the ring during assembly. At least one anchor is unitarily formed with the ring. At least one magnet is coupled with the unitarily formed anchor to couple the at least one magnet with the ring. The magnet is coupled with the ring such that the flux ring may be compressed and expanded with the at least one magnet coupled with the ring during assembly. One of the first or second ends overlaps the other end. The at least one magnet is formed on the ring such that the magnet embeds with the anchor to couple the magnet to the ring. The first and second ends may include at least one mating or meshing projection and receiving recess. The at least one magnet is injection molded onto the ring. Also, the anchor may be an aperture in the ring with a counter-sink. Also, the anchor may be a member unitarily formed with the ring and radially projecting from the ring. Also, a combination of the anchors may be used. An armature assembly is positioned in the motor can housing.

In accordance with a third aspect of the invention, a power tool comprises a housing with a motor in the housing. The motor comprises a motor can housing with a pair of end caps secured to the motor can. A flux ring is positioned within the motor can housing. The flux ring includes a ring member having a first and a second end. The ends are positioned with respect to one another such that the ends move towards and away from one another during compressing and expanding of the ring during assembly. At least one anchor is unitarily formed with the ring. At least one magnet is coupled with the unitarily formed anchor to couple the at least one magnet with the ring. The magnet is coupled with the ring such that the flux ring may be compressed and expanded with the at least one magnet coupled with the ring during assembly. One of the first or second ends overlaps the other end. The at least one magnet is formed on the ring such that the magnet embeds with the anchor to couple the magnet to the ring. The first and second ends may include at least one mating or meshing projection and receiving recess. The at least one magnet is injection molded onto the ring. The anchor may be an aperture in the ring with a counter-sink. The anchor may be a member unitarily formed with the ring and radially projecting from the ring. Also, a combination of the anchors may be used. An armature assembly is positioned in the motor can housing. A power source is coupled with the housing. An activation member is coupled with the motor and the power source for energizing and de-energizing the motor. An output is coupled with the motor such that the motor drives the output during energizing of the motor.

In accordance with a fourth aspect of the invention, a method of manufacturing electrical motors comprises the steps of forming a motor can housing. A flux ring is formed having two ends such that the ends move towards and away from one another during compressing and expanding of the ring during assembly. A pair of magnets are coupled with unitarily formed anchors on the flux ring. The flux ring is compressed, if necessary, with the magnets on the flux ring such that the flux ring has an external diameter smaller than an internal diameter of the motor can housing. The flux ring is inserted into the motor can housing. The flux ring is expanded to frictionally engage the motor can housing. The expanding of the flux ring occurs in response to the release of the compression force on the flux ring. The flux ring is secured to the motor can housing preferably by welding, clinching, fasteners or glue. A first motor cap assembly is secured to the motor can housing. A motor armature assembly is inserted into the flux ring in the motor can housing. A second end cap is coupled with the armature assembly and the motor can housing. The magnets are injection molded onto the flux ring. The flux ring is formed such that the first and second ends overlap one another in the expanded condition in the motor can housing. A portion of the overlapped ends are welded to the housing to secure the flux ring in the motor can housing.

In accordance with a fifth aspect of the invention, a method of manufacturing a power tool comprises the steps of forming a motor can housing. A flux ring is formed having two ends such that the ends move towards and away from one another during compressing and expanding of the ring during assembly. A pair of magnets are coupled with unitarily formed anchors on the flux ring. The flux ring is compressed, if necessary, with the magnets on the flux ring such that the flux ring has an external diameter smaller than an internal diameter of the motor can housing. The flux ring is inserted into the motor can housing. The flux ring is expanded to frictionally engage the motor can housing. The expanding of the flux ring occurs in response to the release of the compression force on the flux ring. The flux ring is secured to the motor can housing preferably by welding, clinching, gluing, mechanical fastening or the like. A first motor cap assembly is secured to the motor can housing. A motor armature assembly is inserted into the flux ring in the motor can housing. A second end cap is coupled with the armature assembly and the motor can housing. The magnets are injection molded onto the flux ring. The flux ring is formed such that the first and second ends overlap or mesh with one another in the expanded condition in the motor can housing. A portion of the overlapped or meshed ends are secured to the housing to fix the flux ring in the motor can housing. A housing half is provided. The motor is positioned in the housing half. An output is positioned in the housing half and coupled with the motor. An activation member is positioned in the housing half and electrically coupled with the motor and the power source to energize and de-energize the motor which in turn drives the output. A second housing half is coupled with the first housing half to form the power tool. A power source is coupled with the housing and electrically coupled with the motor.

Additional objects and advantages of the invention will become apparent from the detailed description of the preferred embodiment, and the appended claims and accompanying drawings, or may be learned by practice of the invention.

DETAILED DESCRIPTION OF THE PREFERRED EMBODIMENT

Figure 1:
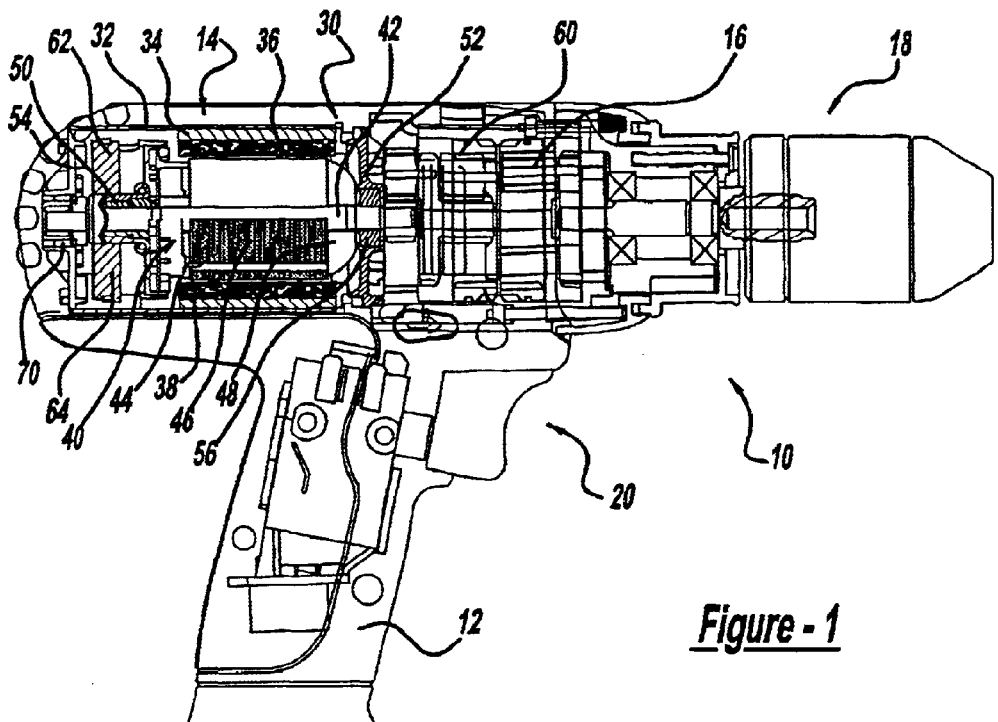
FIG. 1 is a cross-section view of a power tool in accordance with the present invention.

Turning to the figures, FIG. 1 illustrates a power tool, particularly a drill, which is designated with the reference numeral 10. The power tool 10 includes a housing 12 which includes two halves which are integrally connected to one another. A motor 14 is positioned within the housing 12. The motor 14 is coupled with an output 16 which includes a chucking end 18. Also, the motor 14 is electrically coupled with an activation member 20 as well as a power source 22, in this case a battery. The activation member 20 energizes and de-energizes the motor 14 which, in turn, ultimately rotates the chuck 18.

The motor 14 includes a stator assembly 30 which includes a motor can housing 32, flux ring 34, and magnets 36 and 38. An armature 40 includes a shaft 42, a rotor 44 with laminations 46 and windings 48, and a commutator 50. The armature 40 is coupled with the shaft 42 and positioned inside of the motor can housing 32. The motor also includes end plates 52 and 54. End plate 52 includes a bearing 56 which balances one end of the shaft 42. The shaft 42 is coupled with a pinion 60 which is part of the power tool output. Brushes 62 and 64 are associated with the commutator 50. A bearing 70 is also coupled with the end plate 54 to balance rotation of the shaft 42.

Figure 2:
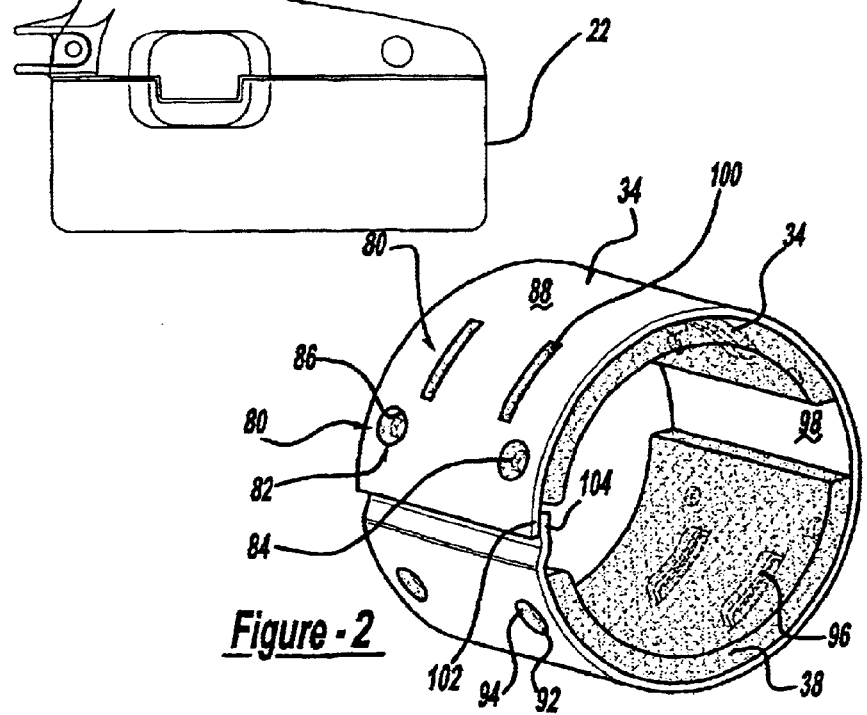
FIG. 2 is a perspective view of a flux ring in accordance with the present invention.
Figure 3:
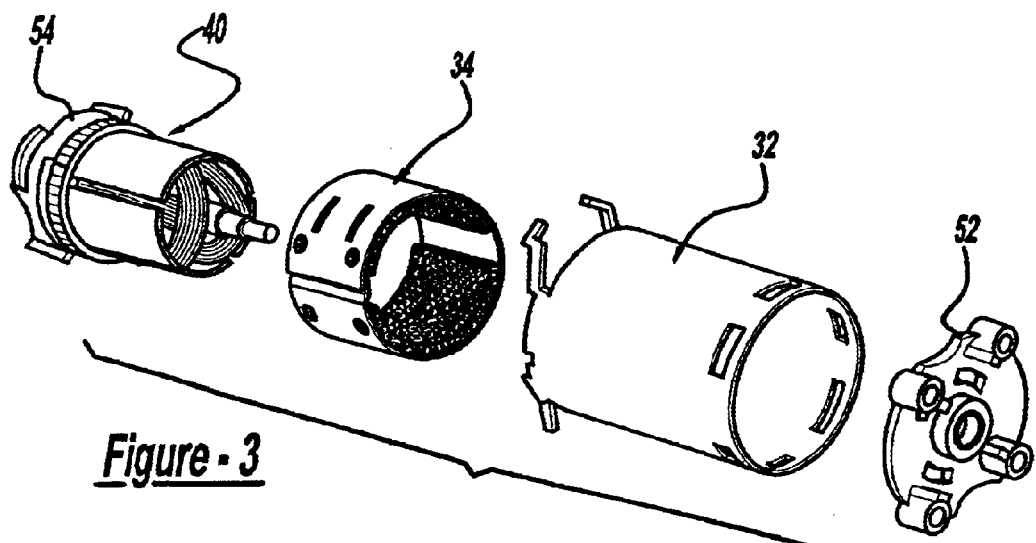
FIG. 3 is an exploded view of a motor including a flux ring in accordance with the present invention.

Turning to FIG. 2, the flux ring 34 is illustrated with magnets 36 and 38. The magnets 36 and 38 are of a molded magnetic material. Preferably, the molded material is an injection molded material. The ring 34 is stamped and rolled and positioned within a die and the magnetic material is molded onto the flux ring. Also, the ring could be a machined part. Further, the magnets could be preformed and glued in place on the ring.

The flux ring 34 includes anchors 80 to retain the magnets 36 and 38 onto the ring 34. The anchors 80 may be of two types. First, anchor 82 is an aperture formed in the flux ring 34. The aperture has a first portion 84 and a second countersink portion 86. The counter-sink portion 86 extends to the exterior 88 of the ring 34. As the molded magnetic material is received in the anchor 82, the molded material embeds with the ring and has a neck 92 and a head 94. The neck 92 and head 94 provide an overall rivet appearance. Thus, the head 94 acts to retain the magnets 36 and 38 on the ring 34. The ring 34 may be comprised of just a plurality of aperture anchors 82 to retain the magnets on the ring 34.

Additional anchors 96 may be utilized on the ring. Anchors 96 are shown radially projecting from the interior surface 98 of the ring 34. However, the anchors 96 could project radially outwardly from the ring 34. Ordinarily, the anchors 96 are stamped or the like into the ring 34 forming an aperture 100 immediately adjacent the projecting anchor 96. Thus, when the molded magnetic material forms around the projecting anchor 96, it likewise goes under the anchor to fill-in the aperture 100 to embed the molded magnetic material with the anchor 96. This provides for a firm securement of the magnet onto the ring 34.

The ring 34 includes a pair of ends 102 and 104. The ends 102 and 104 overlap one another. The overlapping enables a substantially continuous magnetic flux around the ring 34. Also, the ends 102 and 104 enable overlap when the ring is compressed or expanded during positioning of the ring 34 into the motor can housing 32. Note that the ring 34 may be compressed and expanded with the magnets 34 and 36 already secured to the ring. Also, the ends 102 and 104 provide a surface on the ring 34 to be welded to the motor can 32.

Figure 4:
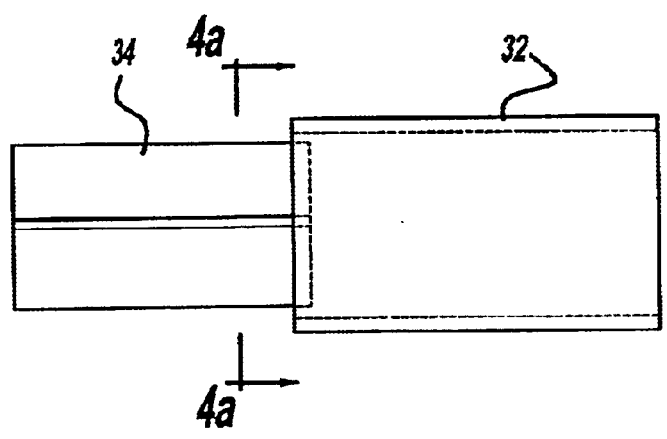
FIGS. 4a–4c illustrate assembly steps of a motor in accordance with the present invention.
Figure 4A:
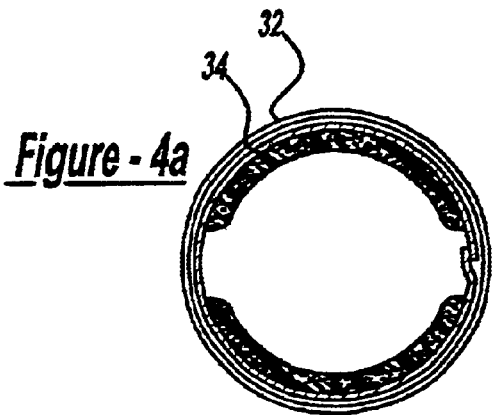
Figure 4B:
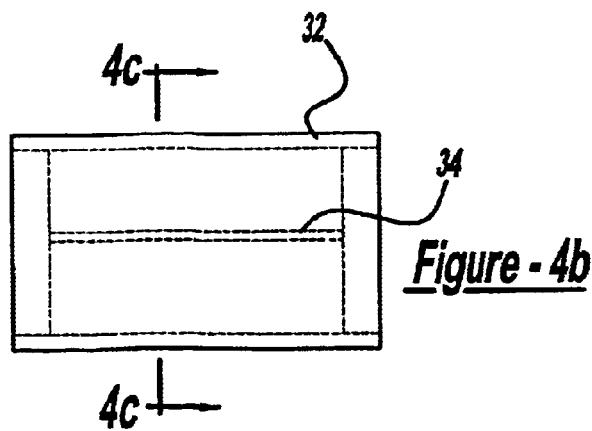
Figure 4C:
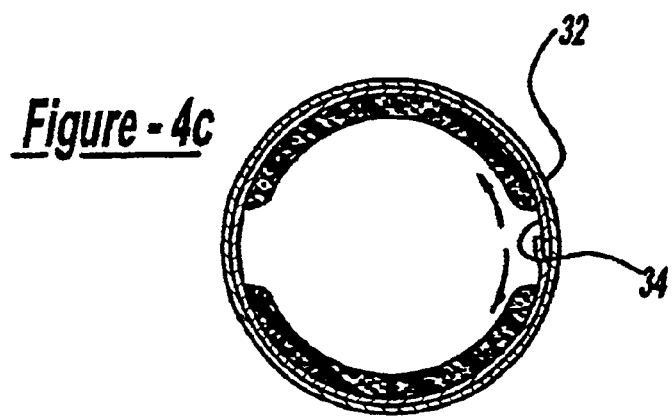
Figure 5A:
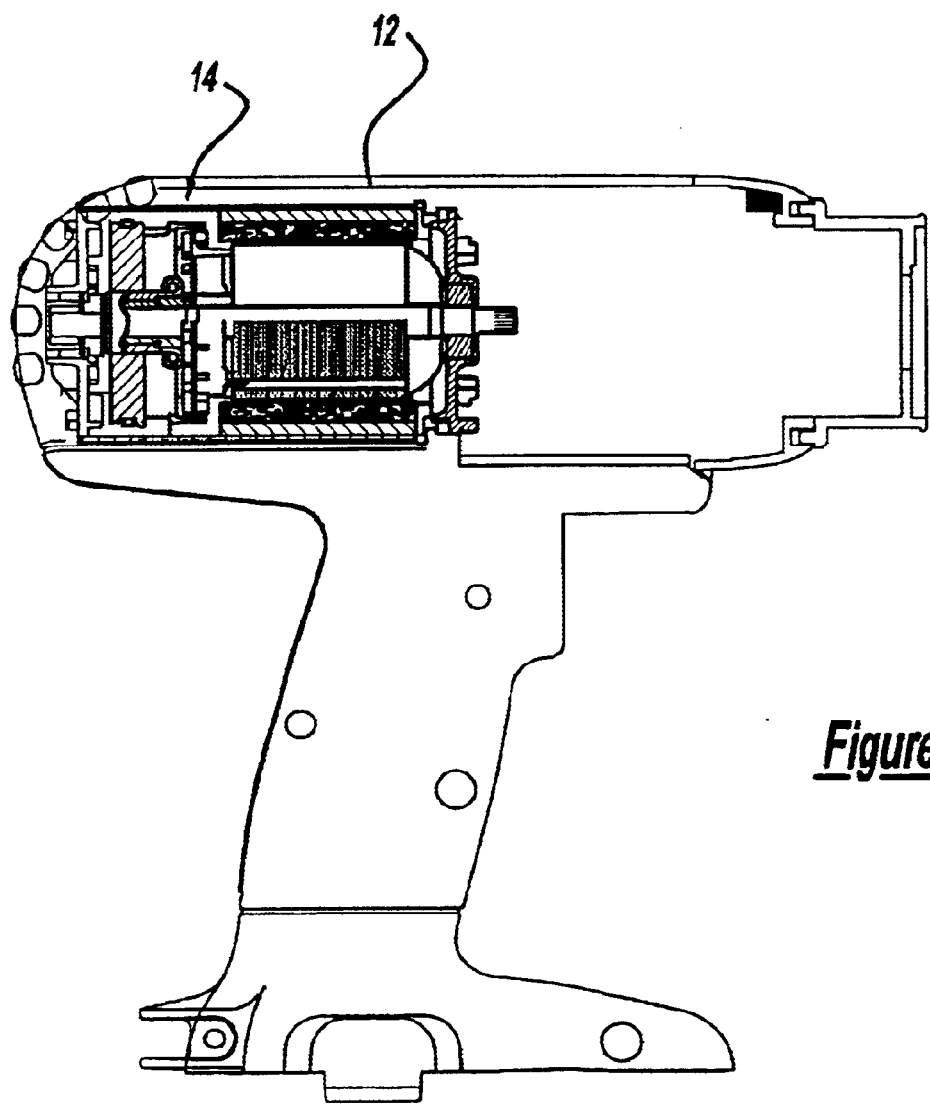
FIGS. 5a–5d illustrate assembly steps of a power tool in accordance with the present invention.
Figure 5B:
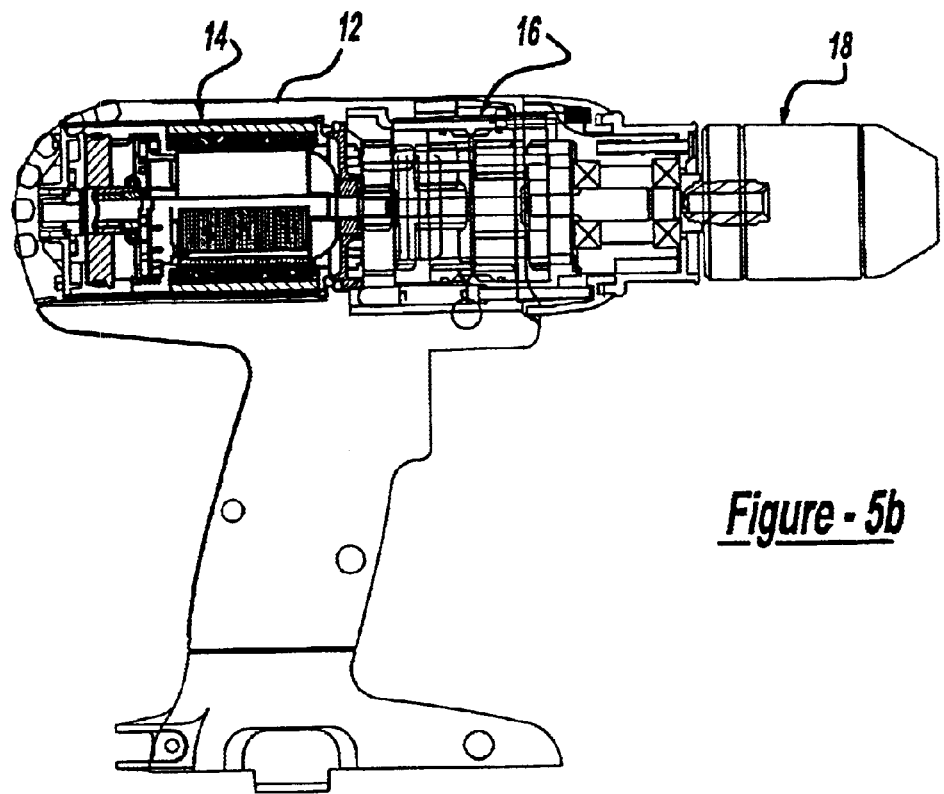
Figure 5C:
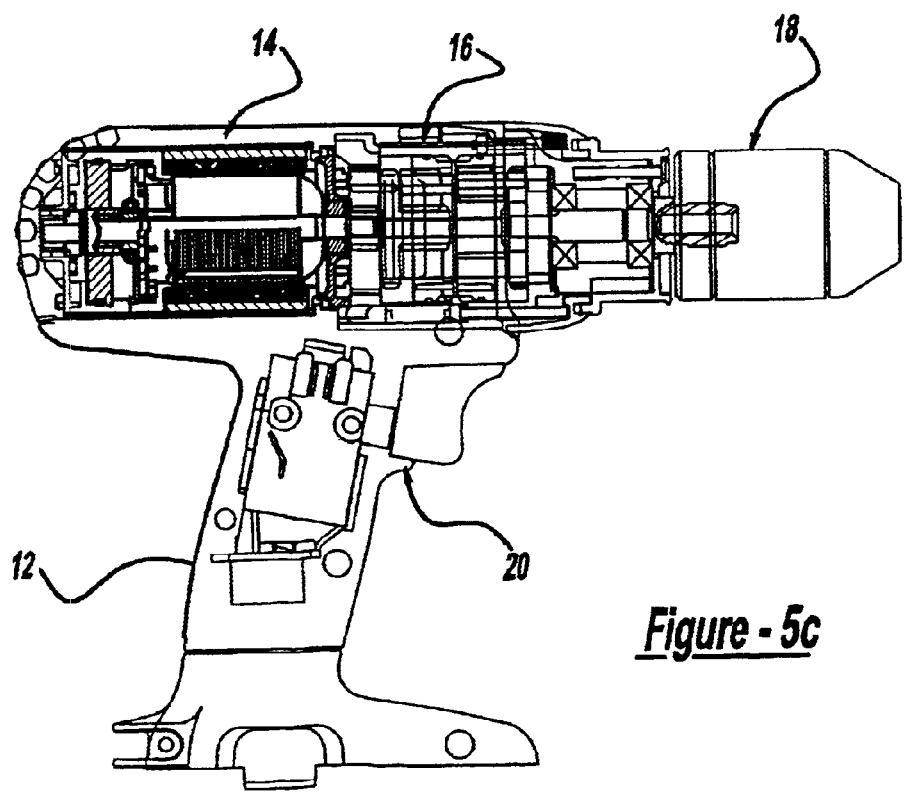
Figure 5D:
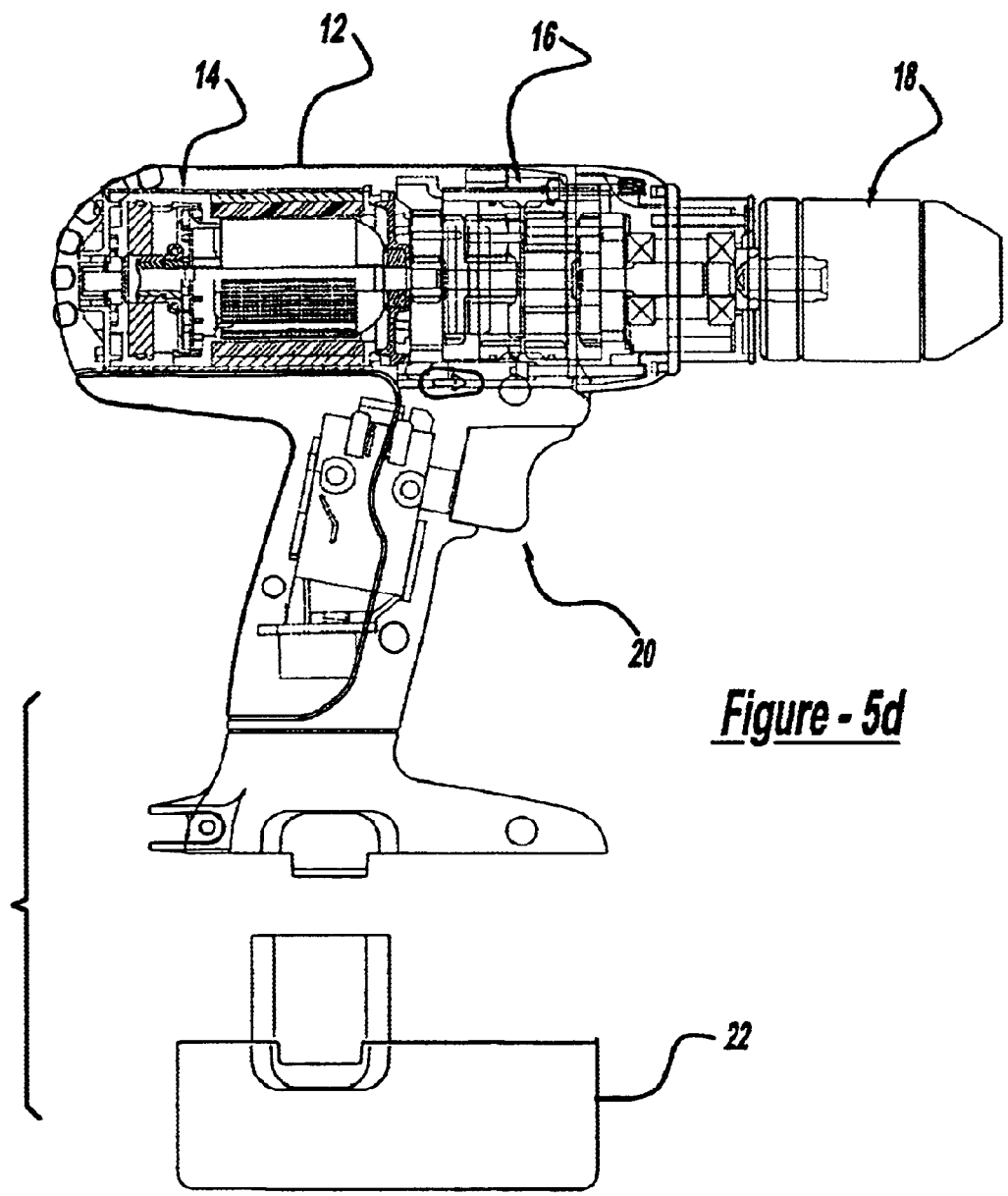

Turning to FIG. 4, a better understanding of the manufacturing of the motor 14 will be had. The motor can housing 32 is provided with two open ends. However, a drawn motor can could be used with a unitary end on the motor can. The ring 34 with the magnets 36 and 38 already on the ring 34 is compressed, if necessary, such that the ring 34 has an outer diameter less than the inner diameter of the motor can housing 32. The ring 34, in a radially compressed condition, is placed inside of the motor can 32. The compressive force is removed from the ring 34 enabling it to expand. As the ring 34 expands, it frictionally engages the motor housing 32 maintaining it in position on the housing 32. Also, the ring could have an outer diameter less than the inner diameter of the motor can. Thus, the ring would be forcibly expanded to frictionally engage the motor can. The ring 34 is then secured to the motor can housing 32 by welding, clinching (e.g. extruding the motor can housing into the flux ring or vice versa), gluing, mechanical fastening (e.g. rivets) or the like. The ring is welded at ends 102, 104 to secure it with the motor can housing 32. Also, the ring 34 may be welded to the motor can at a position 180° from the ends. After welding, the end plate 52 is positioned on one end of the motor can housing 32. The armature 40 with the end plate 54 which includes the brushes 62 and 64 as well as the bearing 70 is inserted into the motor can housing 32. The end plate 54 is coupled with the motor can housing 32 forming the motor 14.

Turning to FIG. 5, the above described motor 14 is positioned into a housing half. The power tool output 16 with the chucking end 18 is coupled with the motor 14. In turn, the activation member 20 is positioned into the housing half and electrically coupled with the motor 14. The second housing half is coupled with the first housing half. Thereafter, the power source 22, in this case a battery, is inserted into the housing 12 and electrically coupled with the activation member 20 which, in turn, is electrically coupled with the motor 14. Also, the motor, output and chuck, and activation member may be assembled together so that it is positioned as a unit into a housing half. The other housing half would then be coupled with the first housing half and the battery would be added. When the activation member energizes the motor 14, the output 16 rotates the chuck 18.

Figure 6:
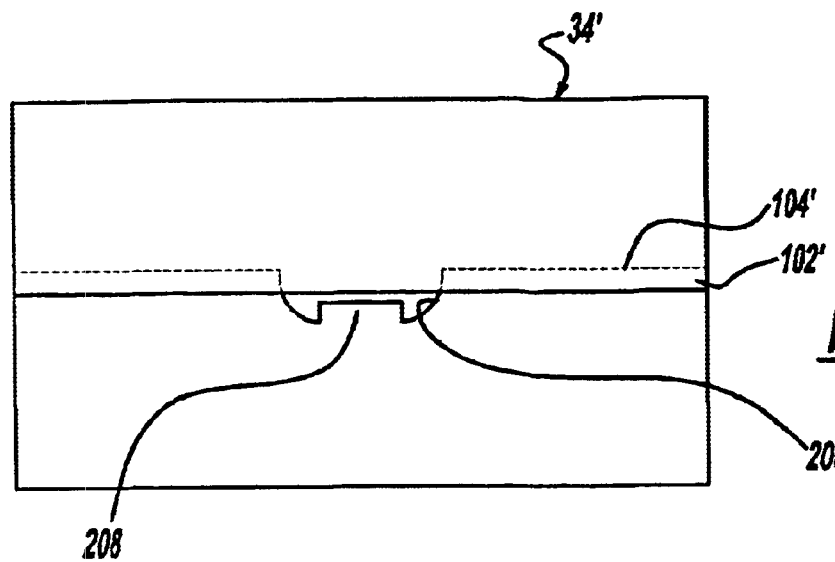
FIG. 6 illustrates another embodiment of a flux ring in accordance with the present invention.
Figure 7:
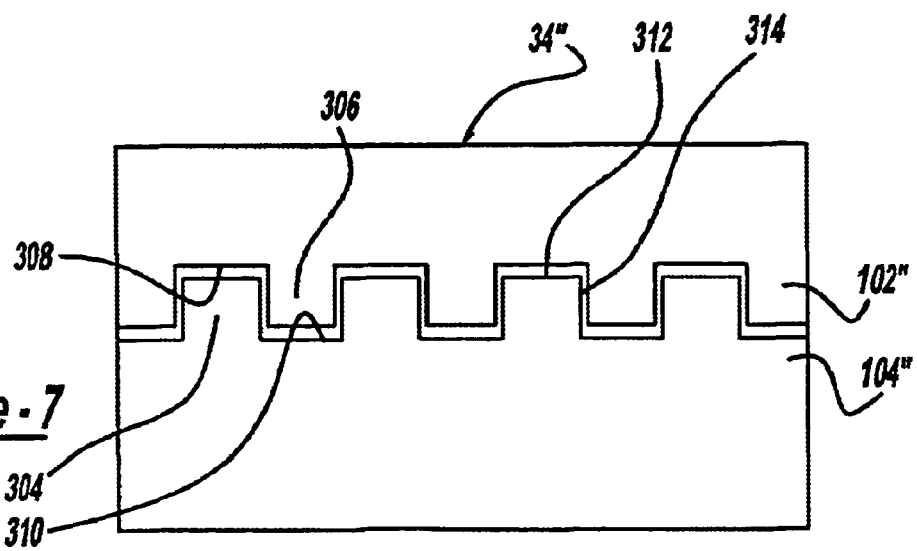
FIG. 7 illustrates an additional embodiment of a flux ring in accordance with the present invention.
Figure 8:
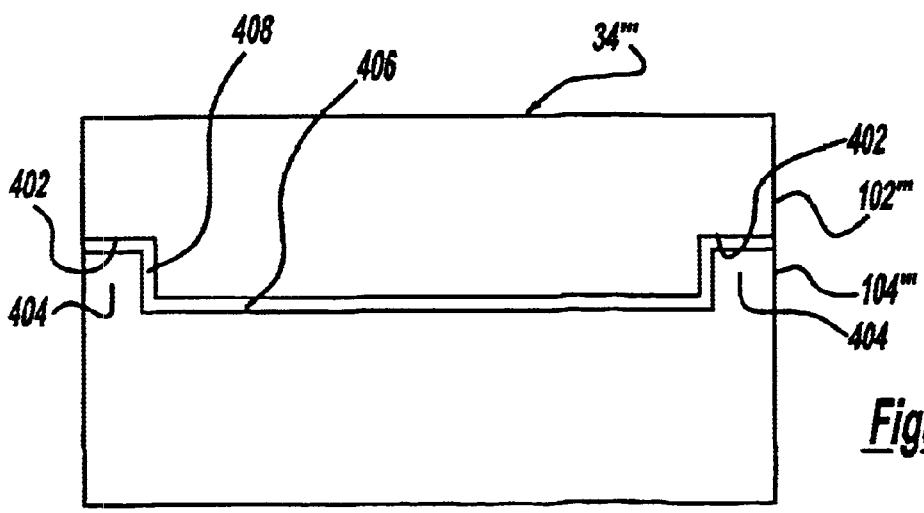
FIG. 8 illustrates an additional embodiment of a flux ring in accordance with the present invention.

FIGS. 6–8 illustrate different ring embodiments. The difference between the rings is at their ends.

FIG. 5 illustrates a ring 34' which has ends 102' and 104'. The end 104' includes a cut-out portion 206 with a projecting member 208. The projecting member 208 serves as a weld location. While a single projecting member 208 is shown, multiple members could be used.

FIG. 7 illustrates an additional embodiment of the present invention. Here, the ends 102" and 104" have alternating projections 304, 306 and recesses 308, 310. The fingers and recesses enable meshing of the ends 102" and 104". Gaps 312 and 314 are formed between the ends 102" and 104". As the ring 34" expands into the motor housing 32, the gap 312 increases in size, while the gap 314 remains substantially constant in size. The gap 314 is maintained sufficiently small such that a weld easily bridges between ends 102" and 104" to the motor housing 32.

FIG. 8 illustrates an additional embodiment of the ring 34'". Here, end 102'" includes a pair of recesses 402 while end 104'" includes a pair of projecting members 404. The projecting members 404 project into the recesses 402 and provide a weld location to weld the ring 34'" to the motor can 32. Also, each end could include one projection and one recess. Gaps 406 and 408 are formed between the ends 102'" and 104'". As the ring 34'" expands into the motor housing 32, the gap 406 increases in size, while the gap 408 remains substantially constant in size. The gap 408 is maintained sufficiently small such that a weld easily bridges between ends 102'" and 104'" to the motor housing 32.

Applicants would like to incorporate by reference the specification and drawings of U.S. patent application Ser. No. 09/492,059 filed Jan. 27, 2000 and entitled "ANCHORING SYSTEM FOR INJECTION MOLDED MAGNETS ON A FLUX RING OR MOTOR HOUSING". The embodiments of the flux ring illustrated in the Ser. No. 09/492,059 application may be equally substituted in the present invention with the exception that the ends of the rings would be modified as described above with respect to FIGS. 2 or 6–8.

While the above detailed description describes the preferred embodiment of the present invention, the invention is susceptible to modification, variation, and alteration without deviating from the scope and fair meaning of the subjoined claims.

What is claimed is:

1. A flux ring comprising:
    a ring member having a first end and a second end, said ends opposing one another such that said ends move towards and away from one another during compressing and expanding of said ring to align the ring in the motor housing, respectively;
    at least one anchor unitarly fanned from said ring;
    at least one magnet molded to surround said at least one unitarily formed anchor for coupling said at least one magnet with said ring, said magnet being embedded on said ring such that said ring may be compressed and expanded with said at least one magnet embedded on said ring.

2. The flux ring according to claim 1, wherein one of said first or second ends overlaps the other.

3. The flux ring according to claim 1, wherein said first and second ends include at least one mating or meshing projection and recess.

4. The flux ring according to claim 1, wherein said anchor being an aperture in said ring, said aperture including a counter-sink portion.

5. The flux ring according to claim 1, wherein said at least one anchor being a member unitarily formed from said ring and radially projecting from said ring.

6. An electric motor comprising:
    a motor can housing;
    two end caps each coupled to said motor can housing;
    a flux ring secured with said motor can housing, said flux ring including:
        a ring member having a first end and a second end, said ends opposing one another such that said ends move towards and away from one another during compressing and expanding of said ring to align the ring in the motor housing during assembly;
        at least one anchor unitarily formed from said ring;
        at least one magnet molded to surround said at least unitarily formed anchor for coupling said at least one magnet with said ring, said magnet being embedded on said ring such that said ring may be compressed and expanded, during assembly, with said at least one magnet embedded on said ring; and
    an armature assembly positioned in said motor can housing.

7. The electric motor according to claim 6, wherein one of said first or second ends overlaps the other.

8. The electric motor according to claim 6, wherein said first and second ends include at least one waxing or meshing projection and recess.

9. The electric motor according to claim 8, wherein said at least one anchor being an aperture in said ring, said aperture including a counter-sink portion.

10. The electric motor according to claim 6, wherein said at least one anchor being a member unitarily formed from said ring and radially projecting from said ring.

11. A power tool comprising:

a housing;

a motor in said housing, said motor comprising:
- a motor can housing;
- two end caps each coupled to said motor can housing;
- a flux ring secured with said motor can housing, said flux ring including:
  - a ring member having a first end and a second end, said ends opposing one another such that said ends move towards and away from one another during compressing and expanding of said ring to align the ring in the motor housing during assembly;
  - at least one anchor unitarily formed from said ring;
  - at least one magnet molded to surround said at least one unitarily formed anchor for coupling said at least one magnet with said ring, said magnet being embedded on said ring such that said ring may be compressed and expanded, during assembly, with said at least one magnet embedded on said ring;
- an armature assembly positioned in said motor can housing;

a power source;

an activation member coupled with said motor and said power source for energizing and de-energizing said motor; and an output coupled with said motor such that said motor drives said output during energizing of said motor.

12. The power tool according in claim 11, wherein one of said first or second ends overlaps the other.

13. The power tool according to claim 11, wherein said first and second ends include at least one mating or meshing projection and recess.

14. The power tool according to claim 11, wherein said at least one anchor being an aperture in said ring, said aperture including a counter-sink portion.

15. The power tool according to claim 11, wherein said at least one anchor being a member unitarily formed from said ring and radially projecting from said ring.

* * * * *

UNITED STATES PATENT AND TRADEMARK OFFICE
CERTIFICATE OF CORRECTION

PATENT NO. : 6,750,579 B2
DATED : June 15, 2004
INVENTOR(S) : Brandon Verbrugge et al.

It is certified that error appears in the above-identified patent and that said Letters Patent is hereby corrected as shown below:

Column 6,
Line 19, "fanned" should be -- formed --.
Line 31, after "said" insert -- at least one --.
Line 49, after "least" insert -- one --.
Line 60, "waxing" should be -- mating --.
Line 62, "claim 8" should be -- claim 6 --.

Signed and Sealed this

Thirtieth Day of November, 2004

JON W. DUDAS
*Director of the United States Patent and Trademark Office*